United States Patent
Porwal et al.

(10) Patent No.: US 11,163,623 B2
(45) Date of Patent: Nov. 2, 2021

(54) SERIALIZING MACHINE CHECK EXCEPTIONS FOR PREDICTIVE FAILURE ANALYSIS

(71) Applicant: Intel Corporation, Santa Clara, CA (US)

(72) Inventors: Gaurav Porwal, Bangalore (IN); Subhankar Panda, Portland, OR (US); John G. Holm, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/866,485

(22) Filed: May 4, 2020

(65) Prior Publication Data

US 2020/0301773 A1    Sep. 24, 2020

Related U.S. Application Data

(63) Continuation of application No. 15/362,522, filed on Nov. 28, 2016, now Pat. No. 10,671,465.

(51) Int. Cl.
*G06F 11/07* (2006.01)

(52) U.S. Cl.
CPC ........ *G06F 11/0724* (2013.01); *G06F 11/079* (2013.01); *G06F 11/0736* (2013.01);
(Continued)

(58) Field of Classification Search
CPC ............. G06F 11/0793; G06F 11/0724; G06F 11/0736; G06F 11/079; G06F 11/0787; G06F 11/0751
See application file for complete search history.

(56) References Cited

U.S. PATENT DOCUMENTS 7,533,300 B2 *   5/2009   Marisetty ............ G06F 11/0772
                                                                  714/27
7,535,825 B1   5/2009   Callon
(Continued)

OTHER PUBLICATIONS

Intel, "Intel 64 and IA-32 Architectures Software Developer's Manual" vol. 3 (3A, 38, 3C & 3C): System Programming Guide, Jun. 1, 2014, Order No. 325384-051US, pp. 1-37.
(Continued)

*Primary Examiner* — Nadeem Iqbal
(74) *Attorney, Agent, or Firm* — Nicholson De Vos Webster & Elliott LLP (57) ABSTRACT

Upon occurrence of multiple errors in a central processing unit (CPU) package, data indicating the errors is stored in machine check (MC) banks. A timestamp corresponding to each error is stored, the timestamp indicating a time of occurrence for each error. A machine check exception (MCE) handler is generated to address the errors based on the timestamps. The timestamps can be stored in the MC banks or in a utility box (U-box). The MCE handler can then address the errors based on order of occurrence, for example by determining that the first error in time causes the remaining error. The MCE can isolate hardware/software associated with the first error to recover from a failure. The MCE can report only the first error to the operating system (OS) or other error management software/hardware. The U-Box may also convert the timestamps into real time to support user debugging.

21 Claims, 7 Drawing Sheets

(52) U.S. Cl.
CPC ...... *G06F 11/0751* (2013.01); *G06F 11/0787* (2013.01); *G06F 11/0793* (2013.01)

(56) References Cited

U.S. PATENT DOCUMENTS

| | | |
|---|---|---|
| 7,546,487 B2 | 6/2009 | Marisetty et al. |
| 8,671,309 B2 | 3/2014 | Raj et al. |
| 9,317,360 B2* | 4/2016 | Vargas ................ G06F 11/1004 |
| 2006/0259831 A1* | 11/2006 | Sohm ................ G06F 9/30145 |
| | | 714/45 |
| 2007/0061634 A1 | 3/2007 | Marisetty et al. |
| 2013/0007507 A1 | 1/2013 | Raj et al. |
| 2013/0339829 A1 | 12/2013 | Vargas et al. |

OTHER PUBLICATIONS

Intel, "Intel 64 and IA-32 Architectures Software Developer's Manual" vol. 3 (3A, 3B, 3C & 3D): System Programming Guide, Order No. 325384-056US, Sep. 2015, pp. 1-37.

IBM, "IBM Power System S824L Technical Overview and Introduction", Dec. 2014, pp. 1-40.

IBM, "The IBM Power8 Processor Core Microarchitecture" (a white paper summary with thoughts and considerations), Los Angeles, California, Feb. 18, 2016, pp. 1-126.

Final Office Action, U.S. Appl. No. 15/362,522, dated Oct. 29, 2019, 19 pages.

Notice of Allowance, U.S. Appl. No. 15/362,522, dated Jan. 15, 2020, 6 pages.

* cited by examiner

| ID | Error | Source | iMC | CA | IO Fabric | Core | UPI | IERR |
|---|---|---|---|---|---|---|---|---|
| 1 | 1b DRAM ECC | Core loads | ERR | | | | | IERR |
| 2 | 2b DRAM ECC | Core loads | ERR | Time Out | Time Out | Time Out | | IERR |
| 3 | 2b DRAM ECC | Core loads | ERR | Time Out | | Time Out | Time Out | IERR |
| 4 | 2b DRAM ECC | EP Reads to Coherent Regions | ERR | Time Out | Time Out | | Time Out | IERR |
| 5 | Upl Link CRC | Load/Store | | | | | ERR | |
| 6 | Upl Link CRC | Load/Store | | Time Out | Time Out | Time Out | ERR | IERR |
| 7 | Upl Link Ctrl Error | | | Time Out | Time Out | Time Out | ERR | IERR |
| 8 | 1b ECC Error LLC | Core loads | | ERR | | Time Out | | |
| 9 | 2b ECC Error LLC | Core loads | | ERR | Time Out | Time Out | | IERR |
| 10 | 2b ECC Error LLC | EP Reads/ Loads | | ERR | Time Out | Time Out | | IERR |
| 11 | Core WB Miss LLC | Core stores | | ERR | Time Out | Time Out | | IERR |
| 12 | Parity Error | Core loads | | Time Out | Time Out | ERR | ERR | IERR |
| 13 | IO Error | Core MMIO Read | | Time Out | Time Out | Time Out | ERR | IERR |

601 → mcelog: Family 6 Model 3f CPU: only decoding architectural errors
Hardware event. This is not a software error.
MCE 0
CPU 72 Bank 8
MISC 15852c886 ADDR 1013f821880
TIME 1452152101 Thu Jan 7 02:35:01 2016
MCG status:
Mci status:
Error overflow
Corrected error
Mci_MISC register valid
Mci_ADDR register valid
MCA: MEMORY CONTROLLER RD_CHANNEL0_ERR
Transaction: Memory read error
STATUS cc00008000010090 MCGSTATUS 0
MCGCAP 700c16 APICID 100 SOCKET ID 4
CPUID Vendor Intel Family 6 Model 63
-------------------------------------------------------------------------------------------

602 → mcelog: Family 6 Model 3f CPU: only decoding architectural errors
Hardware event. This is not a software error.
MCE 1
CPU 72 Bank 11
MISC 900000000003e00
TIME 1452152100 Thu Jan 7 02:35:00 2016
MCG status:
Mci status:
Corrected error
Mci_MISC register valid
MCA: MEMORY CONTROLLER AC_CHANNEL2_ERR
Transaction: Address/Command error
STATUS 8800007f020000b2 MCGSTATUS 0
MCGCAP 700c16 APICID 100 SOCKET ID 4
CPUID Vendor Intel Family 6 Model 63
-------------------------------------------------------------------------------------------

603 → mcelog: Family 6 Model 3f CPU: only decoding architectural errors
Hardware event. This is not a software error.
MCE 2
CPU 72 Bank 13
MISC 900000000000400
TIME 1452152102 Thu Jan 7 02:35:02 2016

SERIALIZING MACHINE CHECK EXCEPTIONS FOR PREDICTIVE FAILURE ANALYSIS

CROSS REFERENCE TO RELATED APPLICATIONS

This application is a Continuation of U.S. patent application Ser. No. 15/362,522, filed Nov. 28, 2016, entitled as "SERIALIZING MACHINE CHECK EXCEPTIONS FOR PREDICTIVE FAILURE ANALYSIS" which is hereby incorporated herein by this reference in its entirety and for all purposes.

BACKGROUND

Complex computing environments can fail in an equally complex fashion. Various forms of error logging may be employed to support debugging and repair of such complex computing systems. However, error logs themselves may be difficult to interpret in many cases. For example, multiple components may be dependent on each other for proper operation. When one component fails, multiple dependent components may also fail to perform expected functions. Such a failure scenario may result in primary, secondary, and even tertiary errors. Such errors are all logged, resulting in a large number of errors for a technician to review when attempting to debug the system to determine the root cause of the errors. Further complicating matters, such errors are typically logged on a per component basis. The errors are then displayed in the order the component's error logs are scanned by the system. The errors are not displayed in order of error occurrence. For example, a system reboot may cause error logs from prior operation to each be scanned and displayed to a user. The errors would be displayed in component order, would all appear to have occurred substantially simultaneously, and would all appear to have occurred concurrently with the reboot. As a result, a hardware technician attempting to debug a computing system to correct a problem is often required to review long error logs for each error and determine which error or error(s) are the cause of the problem and which errors are merely a logical result of the cause.

BRIEF DESCRIPTION OF THE DRAWINGS

The concepts described herein are illustrated by way of example and not by way of limitation in the accompanying figures. For simplicity and clarity of illustration, elements illustrated in the figures are not drawn to scale unless otherwise noted.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, such feature, structure, or characteristic can be employed in connection with another disclosed embodiment whether or not such feature is explicitly described in conjunction with such other disclosed embodiment.

The disclosed embodiments may be implemented, in some cases, in hardware, firmware, software, or any combination thereof. The disclosed embodiments may also be implemented as instructions (e.g. a computer program product) carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Disclosed herein are mechanisms to support improved system debugging, for example via predictive failure analysis. Central Processing Units (CPUs) designed according to Machine Check Architecture (MCA) are subdivided into functional unit blocks (FUBs). The CPUs also include Machine Check (MC) banks configured to store occurrences of errors in the FUBs. In one embodiment, the MC banks receive a clock signal. The MC banks employ the clock signal to store a timestamp upon error occurrence at the point of failure. In another embodiment, a utility box (U-box) on a CPU stores a timestamp upon storage of an error at an MC bank. The timestamps can then be supplied to firmware, an operating system, and/or communicated across a network. The timestamps indicate the time of the occurrence of the error instead of the time the error is read from the MC bank. Accordingly, the timestamp can be employed to organize a plurality of errors in order of occurrence when generating an error log to support determining an order of errors. In turn, the order of errors can be employed to more easily determine the problem causing correlated errors. Error timestamps may be saved during a warm reset. Accordingly, the error timestamps can be compared with MC bank read timestamps to determine whether a system reset has occurred since the occurrence of the error. Further, timestamp order can be used by the firmware to support determinations of whether an error can be contained to prevent a system reboot. Error timestamps may also be forwarded to a baseboard management controller (BMC) to allow the BMC to view and address errors that cannot be captured in real time due to the low power and speed of the component. In another embodiment, only the first error in time is reported to error management hardware/software to reduce debugging complexity. Both corrected and un-corrected errors may receive an error timestamp. In addition, timestamps based on error occurrence allow for more accurate determination of which error is first in time than error logging using an error logging register. Employing the error logging register may give an inaccurate indication of which error is first when multiple error flows result in a race condition. Also, timestamps based on occurrence may provide relative signaling to indicate an order of occurrence of secondary and tertiary errors to further assist in debugging. Timestamps based on error occurrence may also assist in accurately determining mean time between failures (MTBF).

Figure 1:
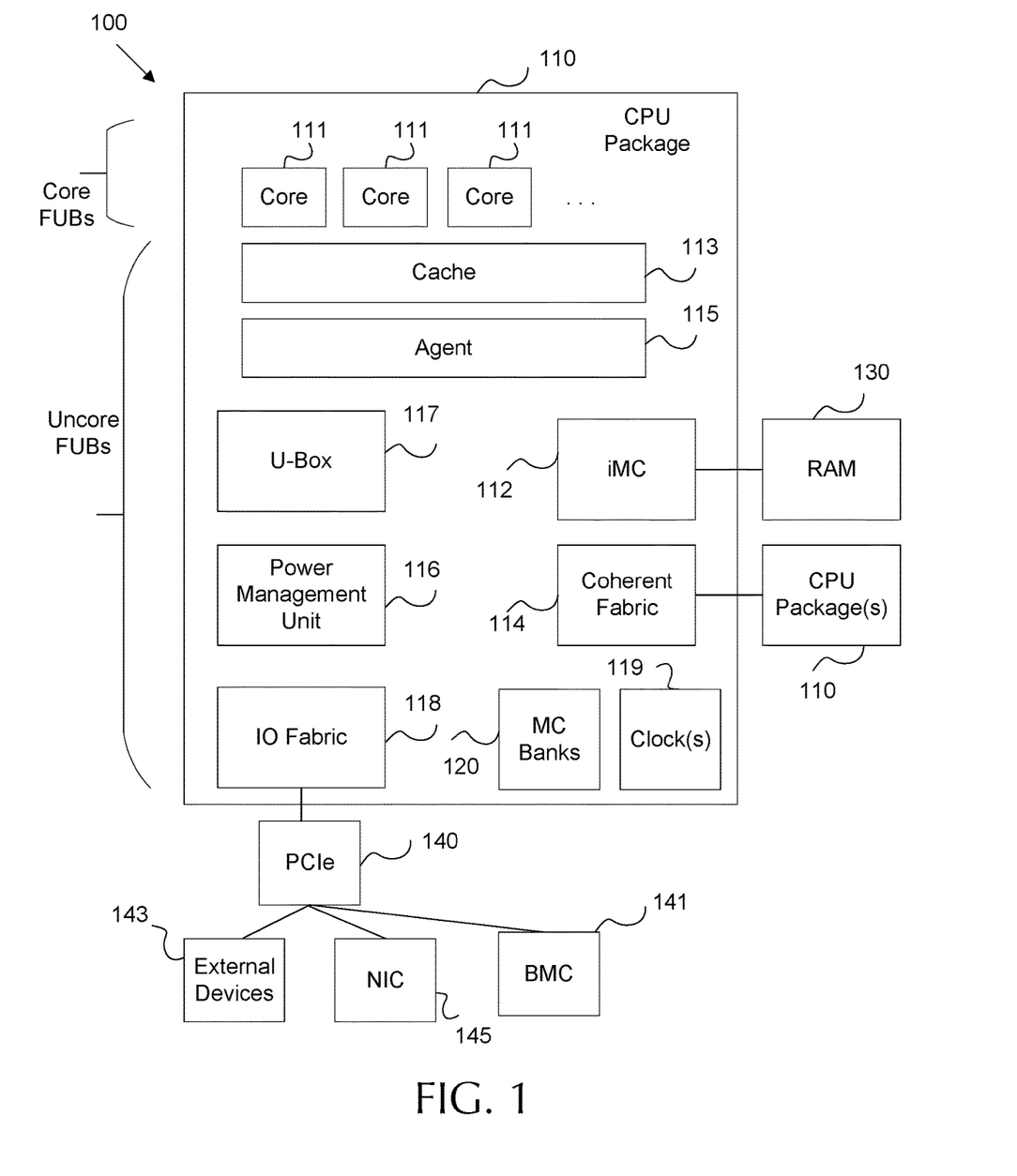
FIG. 1 is a block diagram of an embodiment of a multi-central processing unit (CPU) system implemented according to a machine check (MC) architecture.

FIG. 1 is a block diagram of an embodiment of a multi-CPU system 100 implemented according to a MC architecture. System 100 includes a CPU package 110. A CPU package 110 is a structural unit configured to contain one or more processor dies containing CPU cores 111 and electrically couple the CPU cores 111 to other components. The CPU package 110 may comprise semiconductor material, conductive contacts (e.g. made of gold), and a sealing compound to prevent damage to components. The CPU package 110 contains a plurality of functional unit blocks (FUBs) configured to execute instructions. Each FUB includes a set of hardware configured to provide a set of functionality. The FUBs may include core FUBs, which include one or more CPU cores 111 configured to perform the execution of the instructions. The FUBs may also include "uncore" FUBs that support the core 111 FUBs by communicating with the cores to support execution of the instructions.

Cores 111 are general purpose processing units including transistors embedded into semi-conductive material, each known as a processor die. The cores 111 are configured to execute instructions by operation of the transistors. For example, the core 111 FUBs communicate with the uncore FUBs to obtain data. The cores 111 forward the data through a corresponding transistor network to process the data, for example via execution of corresponding instructions. The processed data and/or the results of the execution may then be stored back in memory via the uncore FUBs.

The uncore FUBs include any components employed to support the execution of instructions by the cores 111. As shown in system 100, the uncore FUBs may include a cache 113, one or more agents 115, a U-box 117, a power management unit 116, an integrated memory controller (iMC) 112, one or more clocks 119, a plurality of MC banks 120, and an input output (TO) fabric 118. It should be noted that the list of uncore components discussed herein in exemplary and simplified for purposes of clarity of discussion. Package 110 may include many other special purposes FUBs, and some of the FUBs disclosed herein may be omitted without departing from the present disclosure. Further, the FUBs are electrically coupled as needed to perform their respective functions. Specific couplings are not depicted in order to simplify and enhance the clarity of the disclosed embodiments.

Cache 113 is any memory positioned in close proximity to the cores 111 to increase access speed during processing. Cache 113 may include a plurality of cache units, configured in layers, to support corresponding groups of cores 111. For example, each core 111 may include a local cache, which may be referred to as a layer one cache. A layer two cache may support a plurality of cores 111. Further, a last level cache may be shared by all of the cores 111 on package 110. Cache 113 stores data for cores 111 and promote data sharing between cores 111 during multi-core execution of a common process. Cache 113 is configured to receive, store, and return data to cores 111 on command.

Caches 113 are managed by agent 115, which is any device configured to manage cache 113 memory and/or system 100 access on behalf of the cores 111. In some embodiments, caches 113 are configured to act in a coherent fashion. In a coherent cache configuration, multiple caches 113 store the same data in different locations for use by different cores 111. Coherence indicates the data maintained consistently, such that a change to data in a first location results in corresponding data in another location being altered or discarded accordingly. Agent 115 may be configured to maintain cache coherence between a plurality of caches 113, in which case the agent 115 may be referred to as a coherence engine (C-Box). Agent 115 may also act as a system interface (S-Box) between the caches 113 and the other uncore FUBs. Agent 115 may also comprise a router (R-Box) for routing data packets between the cores 111 (e.g. via the S-Box) and the other uncore FUBs.

Cores 111 often operate on data that is too large to exist completely on cache 113. Accordingly, package 110 is coupled to random access memory (RAM) 130. RAM is short term memory positioned off of the CPU package 110. RAM 130 holds more data than cache 113, but is positioned farther away from the cores 111 than cache 113. Hence, RAM 130 has a slower access time than cache 113. For example, an application and/or an active application function may be stored in RAM 130. Portions of the active application functions are communicated from RAM 130 to cache 113, and vice versa, on an as needed basis, which allows the cores 111 to operate on data stored in the faster cache 113 system. iMC 112 acts as a memory controller (M-Box), and functions as an interface between RAM 130 and caches 113 (e.g. via agent 115). For example, iMC 112 may translate read and write commands (e.g. from cores 111/agent 115) into specific memory commands, and schedule such commands based on memory timing to support communication between RAM 130 and the other uncore FUBs.

CPU package 110 is configured to communicate with a plurality of other CPU packages 110, each with corresponding cores 111 and uncore FUBs. Accordingly, CPU packages 110 can operate together to apply a large number of cores 111 to execute applications and perform other processing tasks. CPU packages 110 are interconnected via coherent fabric 114. Coherent fabric 114 is a CPU package 110 interconnect configured to communicate data between CPU packages 110 while maintaining data coherence between caches 113 located on separate CPU packages 110. For example, coherent fabric 114 may include a plurality of conductive traces for communication as well as a controller to maintain coherence. Accordingly, coherent fabric 114 communication supports cross package 110 application of a plurality of cores 111 to a common process (e.g. multi-threading). CPU package 110 may also contain additional communication fabrics as needed, for example a direct media interface (DMI), etc.

Uncore and core FUBs operate based on one or more clock signals. For example, hardware components may perform actions by transitioning between states. Such state transitions may occur based on clock signals. Such clock signals are provided via one or more signal clocks 119. A clock 119 is a circuit/signal generator that emits a clock signal that oscillates in a regular pattern between a predefined high amplitude value and a predefined low amplitude value at a specified frequency.

Power management unit 116 acts a primary power management controller (W-Box) for the components of CPU package 110. For example, the power management unit 116 is configured to increase or throttle the electrical power applied to CPU package 110. Power changes may be selected to prevent overheating, place one or more cores 111 in turbo mode for high speed processing, and/or to react to other specified events. Power management unit 116 may also store specified system events related to power for reporting to other components.

Package 110 communicates with external components via IO fabric 118. IO fabric 118 includes a plurality of electrically conductive traces and may include one or more controllers to manage communications. In some embodiments, the package 110 employs IO fabric 118 to communicate with external components via a Peripheral Component Interconnect Express (PCIe) communication protocol. For example, package 110 may be positioned on a circuit board (e.g. motherboard) that includes a PCIe bus 140. PCIe bus 140 is a high speed serial computer expansion bus configured to communicate data between IO fabric 118 and a plurality of external devices 143. External devices 143 may be any hardware devices positioned in a computing environment and configured to support computation by the cores 111. For example, external devices 143 may include external hard drives for long term storage, video processing cards, etc. Specifically, PCIe bus 140 may be employed to communicate with external devices such as a network interface controller (NIC) 145 and a baseboard management controller (BMC) 141. NIC 145 is a network interface device employed to communicate data between system 100 to other devices over a network, such as a local area network (LAN), wide area network (WAN), data center network, cloud network, the Internet, etc. The BMC 141 is a specialized low power service processor that monitors the physical state of system 100. For example, BMC 141 may monitor and store internal physical variables such as temperature, humidity, power-supply voltage, fan speeds, communication parameters, operating system (OS) functions, etc. The BMC 141 may also initiate hardware changes, such as rebooting a system, and report system status to a remote administrator on command. The BMC 141 may be positioned on a motherboard adjacent to CPU packages 110.

MC banks 120 are a plurality of registers configured to store data upon occurrence of an error. Each MC bank 120 is configured to store error data upon occurrence of an error in one or more corresponding FUBs. In other words, each FUB is associated with an MC bank 120, but some MC banks 120 may store error data for more than one FUB. MC banks 120 are employed to detect, store, and report hardware errors to a local OS, to the BMC 141, and/or over a network via the NIC 145. Errors may occur for many reasons. For example, errors may occur due to hardware/software timeouts, damaged memory sectors, improper system configuration, improper voltage levels due to a damaged power supply, damaged parts, faulty optimization instructions, faulty power management instructions, etc. The MC banks 120 store an address of hardware that produced the error, data describing the error, whether the error was recoverable (e.g. whether the error requires a reboot), etc. In some embodiments, the MC banks 120 are also configured to store a timestamp, based on the clock signal from the clocks 119. Each timestamp is stored upon occurrence of the corresponding error. In many cases, a single error in one FUB can cause multiple dependent errors in other FUBs. An OS may obtain data from MC banks 120 in a non-temporal order, such as based on socket number etc. Accordingly, an OS may not be able to tell which error came first in time. Hence the OS may not be able to determine which error caused the reported problem and which errors are dependent errors. The timestamps stored upon occurrence of the corresponding errors may be used by the OS, system firmware, the cores 111, the BMC 141, and/or a network administrator via the NIC 145 to determine the primary error. It should be noted that timestamps stored upon error occurrence operate differently than timestamps obtained upon MC bank 120 read. For example, MC banks 120 may all be read upon reboot, which would produce read timestamps occurring in MC bank 120 read order (e.g. socket order) and occurring after a reboot. As such, timestamps stored upon read may not provide sufficient information to determine a causal relationship between dependent errors. However, timestamps stored on occurrence indicate the causal error as occurring before the dependent errors. Further, BMC 141 is a low power device that operates slowly relative to CPU package 110. By forwarding timestamps stored on error occurrence to the BMC 141, the BMC 141 can address errors that would otherwise be dealt with too quickly to be addressed by the BMC 141. Such timestamps provide a chronological error history, allows correlation of errors in a single CPU package 110 or across multiple CPU packages 110, and can be employed to disambiguate between real causes of a reboot error.

U-Box 117 is a system configuration controller. U-Box 117 includes a counter and global state registers, and is configured to monitor and store events occurring on CPU package 110. In some embodiments, the U-box 117 is configured to store timestamps on occurrence of errors corresponding to MC banks 120. The U-Box 117 may also be configured to report such errors to the OS, system firmware, the cores 111, the BMC 141, and/or the network administrator via the NIC 145. The U-Box 117 may be further configured to convert timestamps based on system clock cycle into global time (e.g. wall time) for ease of use by a system administrator. Further, in the event that timestamps are stored in multiple MC banks 120 based on different clocks signals, the U-Box 117 may employ a time difference between the clock signals to correlate the error occurrence timestamps and provide each of the timestamps according to a global time.

Figure 2:
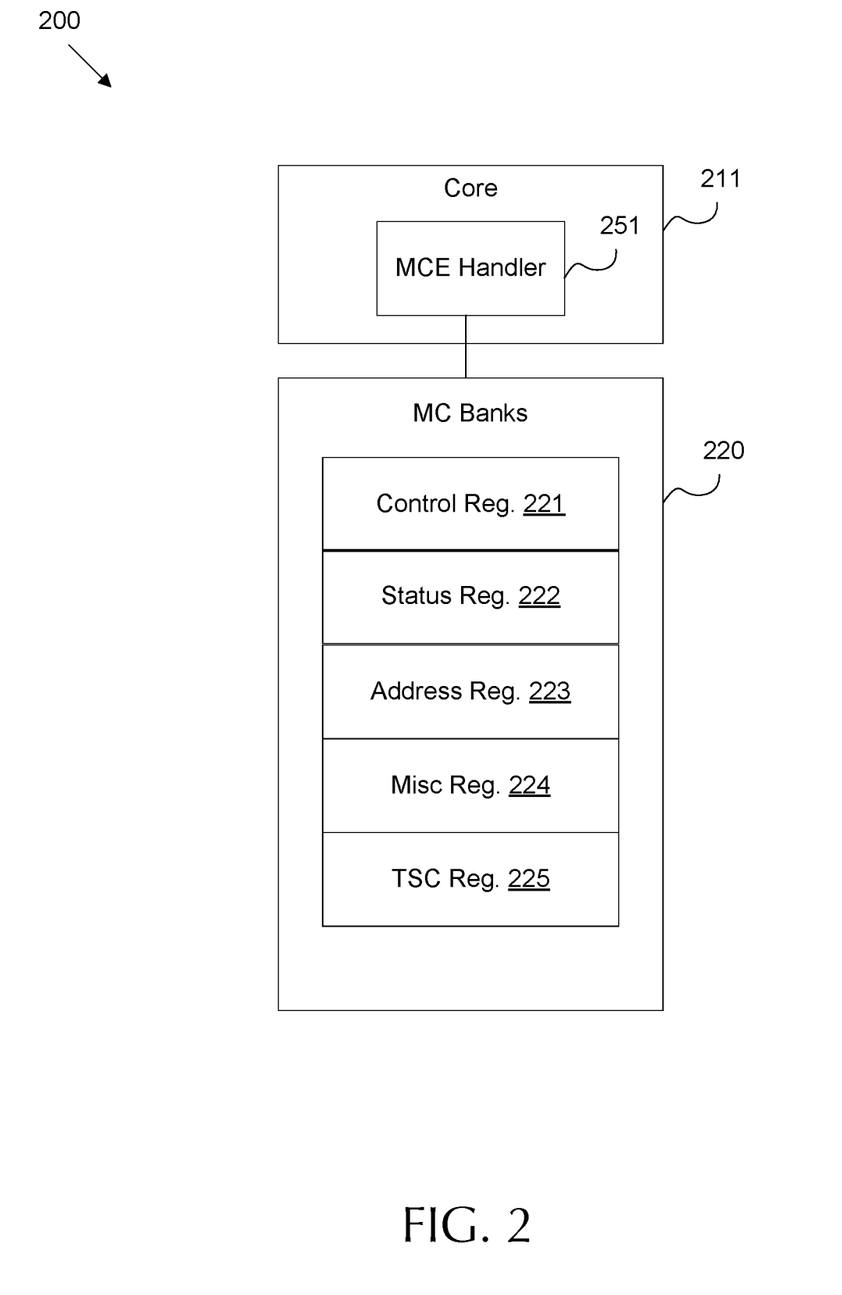
FIG. 2 is a block diagram of an embodiment of a system for handling exceptions by storing timestamps in MC banks.

FIG. 2 is a block diagram of an embodiment of a system 200 for handling exceptions by storing timestamps in MC banks 220. For example, system 200 may be implemented by employing hardware that is substantially similar to system 100. As another example, system 200 may be implemented on a processor with multiple components, such as a general purpose CPU as discussed in system 100, a graphics processing unit (GPU), network processor, application specific circuit, etc. System 200 includes at least one core 211 and a plurality of MC banks 220, which are similar to cores 111 and MC banks 120, respectively.

Upon occurrence of an error at a FUB, an MC bank 220 corresponding to the FUB stores data indicating the error. The MC bank 220 includes registers to store such data. For example, the MC bank 220 may include a control register 221, a status register 222, an address register 223, a miscellaneous register 224, and a time stamp counter (TSC) register 225. In some embodiments, data relevant to the error is latched into the registers upon occurrence of the error, for example at a clock signal edge immediately following the error. The control register 221 includes data indicating that hardware unit (e.g. FUB) that produced the error. The status register 222 contains data indicating whether the error was corrected and/or recoverable without a system reset. The address register includes data indicating an address of code or memory location that resulted in a machine check exception (MCE) associated with the error. The TSC register 225 includes the timestamp generated upon error occurrence.

As noted above, an MCE may be generated upon occurrence of an error. Upon occurrence of an MCE, a core 211 and/or firmware related to the FUB corresponding to the error generates an MCE handler 251. The MCE handler 251 is a firmware process configured to determine the timestamp for the error and then address the error. Pseudo code to a determine a timestamp for an error in a corresponding MC bank 220 may be expressed as follow:

If(mce_detected):
MCi_TSC [63:0]=free_running_clock_counter[63:0]

where mce_detected indicates the presence of a machine check error, MCi_TSC indicates the TSC register 225 for an example MC bank (e.g. the MCi MC bank), [63:0] indicates a length of the timestamp to be stored (e.g. 63 bits), and free_running_clock_counter indicates the clock value to be stored to the TSC register 225 (e.g. from a clock 119).

The MCE handler 251 can address the error in various ways, depending on the embodiment. In an embodiment, the MCE handler 251 collects data indicating a plurality of related errors and the corresponding timestamps from the MC banks 220. The MCE handler 251 then employs the timestamps to determine which of the errors occurred first in time. The knowledge of which error occurred first in time (e.g. the first/causal error) allows for multiple debugging options, such as platform level fault isolation, error containment, and/or predictive failure analysis. Platform level fault isolation and error containment are mechanisms for preventing an error/fault from propagating from a first system to a second system. Predictive failure analysis is a mechanism for analyzing trends in corrected errors, predicting future errors, and proactively avoiding the predicted errors.

For example, the MCE handler 251 may determine that the first error is software related. The MCE handler 251 may then determine a software application that corresponds to the first error (e.g. via a processor execution trace) and isolate the software application to recover from all of the errors. In such a case, the isolated software application may be forcibly closed without requiring a complete system reset. As another example, the MCE handler 251 may determine that the error is hardware related. The MCE handler 251 may determine which FUB is responsible for the first error. The MCE handler 251 may then recover from all the errors by preventing further allocation of corresponding hardware at the FUB associated with the hardware error. Such a response may be employed for errors caused by a damaged memory sector in RAM or cache. Further, repeated errors in the same memory space may indicate a likelihood of total failure/system crash. As such, repeated failures may be communicated to an administrator when an error severity exceeds a threshold to prevent a total system failure. In yet another embodiment, the MCE handler 251 can forward data indicating the first error to the OS without forwarding data indicating the errors that did not occur first in time. In such a case, the administrator need not be burdened with the extra data associated with the dependent errors, allowing for easier debugging. In another embodiment, the MCE handler 251 can collect the data indicating all of the errors as well as the corresponding timestamps. The data and timestamps for all of the errors can then be forwarded to the OS to allow the administrator to debug the errors with knowledge of which error came first and which errors occurred as a result of the first error. In yet another embodiment, the timestamps can be forwarded to the OS from the MC banks 220 upon a warm reset (e.g. a system 200 reset without complete power loss). The timestamps indicating time of error occurrence may allow an administrator to determine that the errors occurred prior to the warm reset. For example, a comparison of the timestamp of error occurrence with the timestamp for MC bank 220 read would clearly indicate that the error occurred prior to the reset and not during system bootstrapping. The MC banks 220 may also forward the error occurrence timestamps and corresponding error data to a BMC and/or NIC, such as BMC 141 and NIC 145, respectively. The BMC may then use the timestamps for error sorting, allowing the errors to be transmitted to an administrator (e.g. over a network) in order of error occurrence and/or allowing only the first error in time to be transmitted. Errors may ultimately be displayed to a user/network administrator via an error log. While specific examples of error timestamps usage are disclosed, it should be noted that the above examples are presented for reasons of clarity and should not be considered exhaustive. Many additional uses of the error occurrence timestamp may be employed without departing from the present disclosure.

Figure 3:
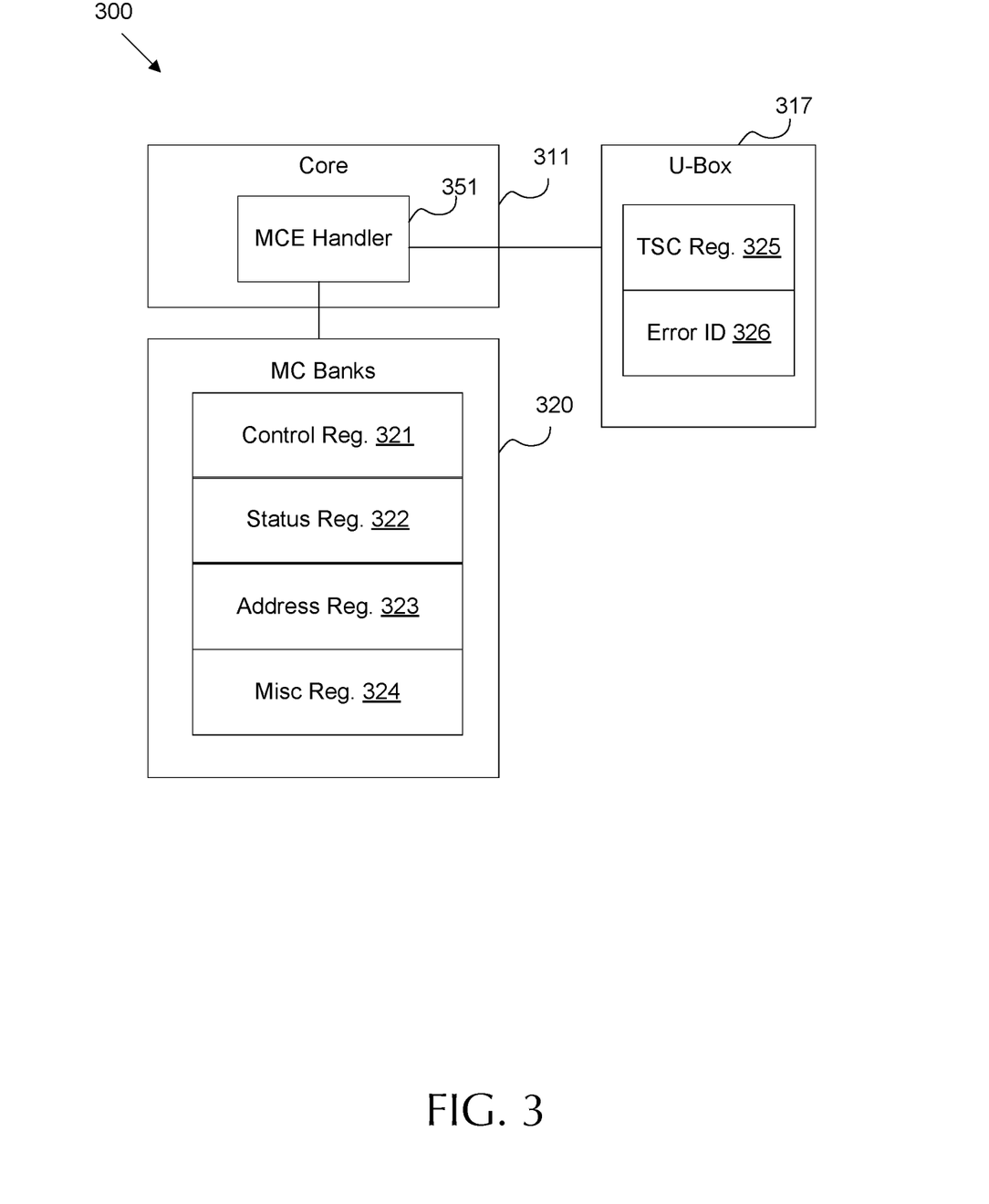
FIG. 3 is a block diagram of an embodiment of a system for handling exceptions by storing timestamps in a utility box (U-Box).

FIG. 3 is a block diagram of an embodiment of a system 300 for handling exceptions by storing timestamps in U-Box 317. For example, system 300 may be implemented by employing hardware that is substantially similar to system 100. As another example, system 300 may be implemented on a processor with multiple components, such as a general purpose CPU as discussed in system 100, a graphics processing unit (GPU), network processor, application specific circuit, etc. System 300 is also similar to system 200, but is configured to store an error occurrence timestamp in a U-box 317 instead of at the corresponding MC bank 320. System 300 includes a core 311 that implements an MCE handler 351 and MC banks 320 that include a control register 321, a status register 322, an address register 323, and a miscellaneous register 324, which may be substantially similar to core 211, MCE handler 251, MC banks 220, control register 221, status register 222, address register 223, and miscellaneous register 224, respectively. System 300 further includes a U-Box 317, which may be substantially similar to U-Box 117.

As noted above, the U-Box 317 is configured to monitor events occurring on a CPU package. As such, the U-Box 317 includes one or more TSC registers 325, which are memory locations configured to store timestamps upon the occurrence of an error at one of the FUBs. Accordingly, when an error occurs at a FUB, information identifying the error is stored in the registers of the corresponding MC bank 320. The U-Box 317 is configured to monitor errors as events. When the error occurs, the U-Box 317 receives an indication of the error, for example from the MCE handler 351. The U-Box 317 then stores a timestamp indicating the time of occurrence of the error in TSC register 325. The U-Box 317 may maintain a global system 300 clock and hence the timestamp may be stored as a global timestamp value. The U-box 317 may receive the timestamp from the MCE handler 351 and convert the timestamp as needed or may generate a timestamp upon receipt of the error. The U-box 317 may also maintain error identifiers (IDs) 326 corresponding to the timestamps to support correlation of each timestamp to each error as stored in the MC banks 320 for error logging purposes. For example, the error IDs 326 may indicate the address of the MC bank 320 associated with the error, the address of the code that generated the error, an indication of the hardware unit responsible for the error, etc.

After storing the timestamp in the TSC register 325, the U-box 317 can address the error accordingly. For example, the U-box 317 can receive the error and/or timestamp from the MCE handler 351 and forward the timestamp and associated data to the OS. In some embodiments, the U-box 317 may convert the timestamp into real time (e.g. wall clock time) and forward the resulting converted time data corresponding to the timestamps to the OS. In some embodiments, the U-box 317 may forward error data, timestamps, and/or converted time data to a NIC, such as NIC 145, for communication to a network administrator via a network. In some embodiments, the U-box 317 may forward error data, timestamps, and/or converted time data to a BMC, such as BMC 141, for error sorting and communication to a network administrator. The U-box 317 may also take other actions similar to the actions discussed with the respect to MCE Handler 251 in FIG. 2. For example, the U-box 317 may determine which of a group of errors occurred first in time and only report the first error or may forward timestamps/ time data for all errors, etc. Errors may ultimately be displayed to a user/network administrator via an error log. While specific examples of error timestamps usage are disclosed, it should be noted that the above examples are presented for reasons of clarity and should not be considered exhaustive. Many additional uses of the error occurrence timestamp may be employed without departing from the present disclosure.

Figure 4:
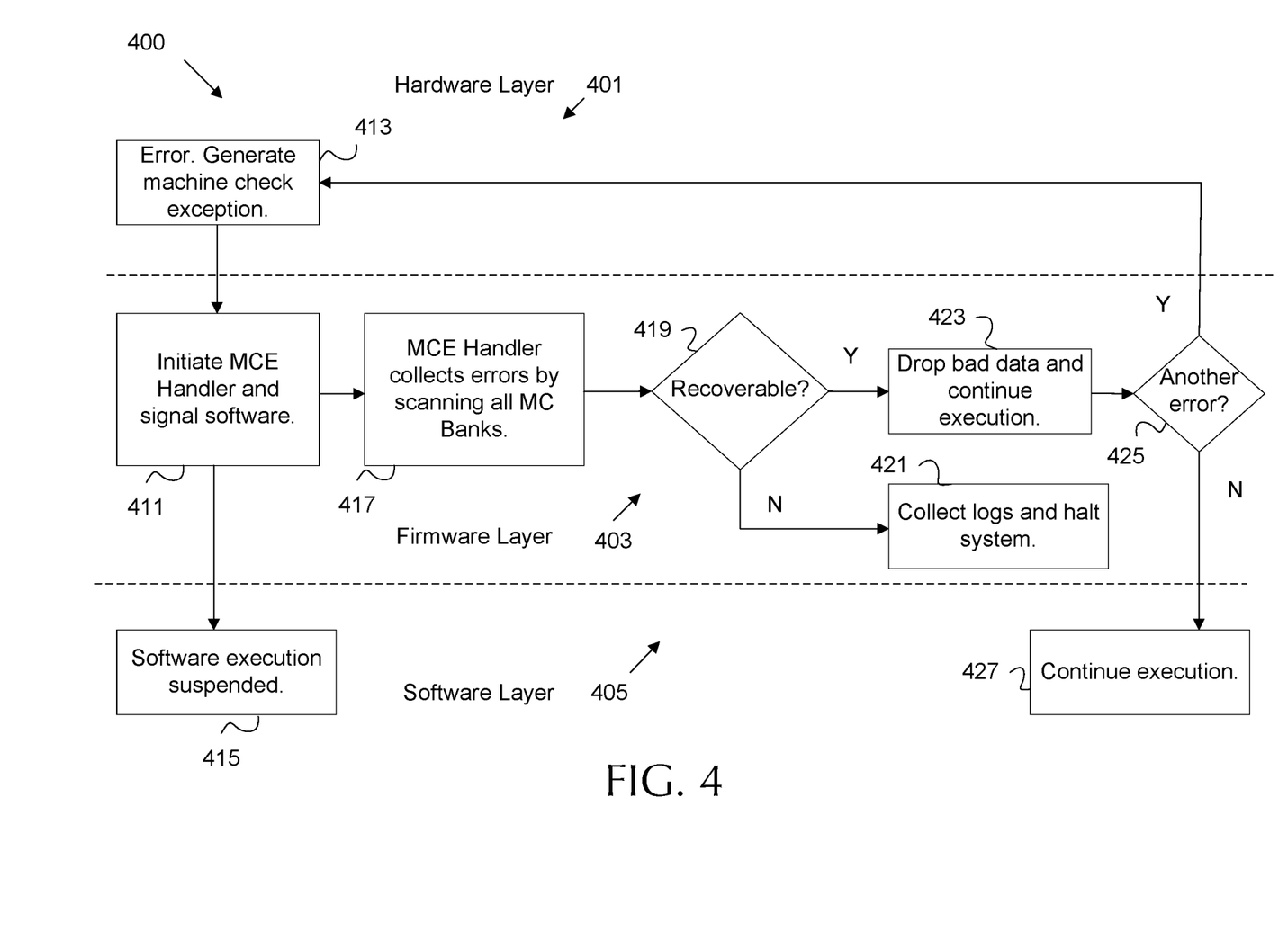
FIG. 4 is a flow diagram of an embodiment of a method for exception handling.

FIG. 4 is a flow diagram of an embodiment of a method 400 for exception handling. Method 400 may be implemented by a system, such as system 100, 200, and/or 300. The system associated with method 400 is categorized into a hardware layer 401, a firmware layer 403, and a software layer 405. The hardware layer 401 encompasses physical computer components, such as a CPU package. The firmware layer 403 includes firmware drivers and other functional machine code employed to operate the hardware. The software layer 405 includes software applications configured to interact with the hardware by sending commands to the firmware layer for translation into functional machine code.

At block 413, an error occurs at the hardware layer. As discussed above, an error may occur for a variety of reasons such as receiving a timeout occurring when a device fails to respond to a command, receiving an unexpected or incorrect response resulting from a hardware malfunction, receiving an indicator of a hardware component operating outside of expected parameters, etc. An MCE is generated in response to the error. An MCE is an indication of a computer hardware error as detected by a CPU.

At block 411, the firmware layer 403 receives the MCE and initiated a MCE handler, such as MCE handler 251 or 351, to address the error. The firmware layer 403 also signals the software layer 405 that an MCE has occurred. At block 415, the software later 405 suspends execution of software processes until the MCE can be addressed.

At block 417, the MCE handler collects data related to the hardware error(s) by scanning all of the MC banks (e.g. MC banks 120, 220, and/or 320). At block 419, the MCE handler determines whether the error(s) found in the MC banks can be recovered from without restarting the system. The method 400 proceeds to block 423 if the errors are recoverable and block 421 if the errors are not recoverable. The MCE handler may employ timestamp data indicating the time of occurrence of the associated errors to determine whether the errors are recoverable. For example, the MCE handler may employ the timestamp data to determine the first error in time and may address only the first error. As another example, the MCE handler may determine to isolate a memory location associated with the first error, terminate a software process associated with the first error, etc.

At block 421, the MCE handler has determined that the first error in time is not recoverable. The MCE handler may collect and store system logs indicating the error(s) and corresponding timestamp data. The MCE handler may then halt the system by initiating a shutdown or a reboot.

At block 423, the MCE handler has determined that the error(s) are recoverable and proceeds to address the error(s). The MCE handler drops any bad data, isolates the problematic software and/or hardware and prepares to continue execution of software processes by terminating. The method 400 then proceeds to block 425. At block 425, the firmware decides if another error has been detected. If so, the method 400 returns to block 413 and initiates another MCE. If no other errors/MCEs are detected, the firmware layer 403 signals the software layer at block 427. The software layer 405 then continues execution of any software that was not isolated to recover from the MCE. As such, by employing the timestamps associated with error occurrence, the MCE handler can determine the first error in time and employ such information to recover from more errors without requiring a system halt/reset at block 421.

Figure 5:
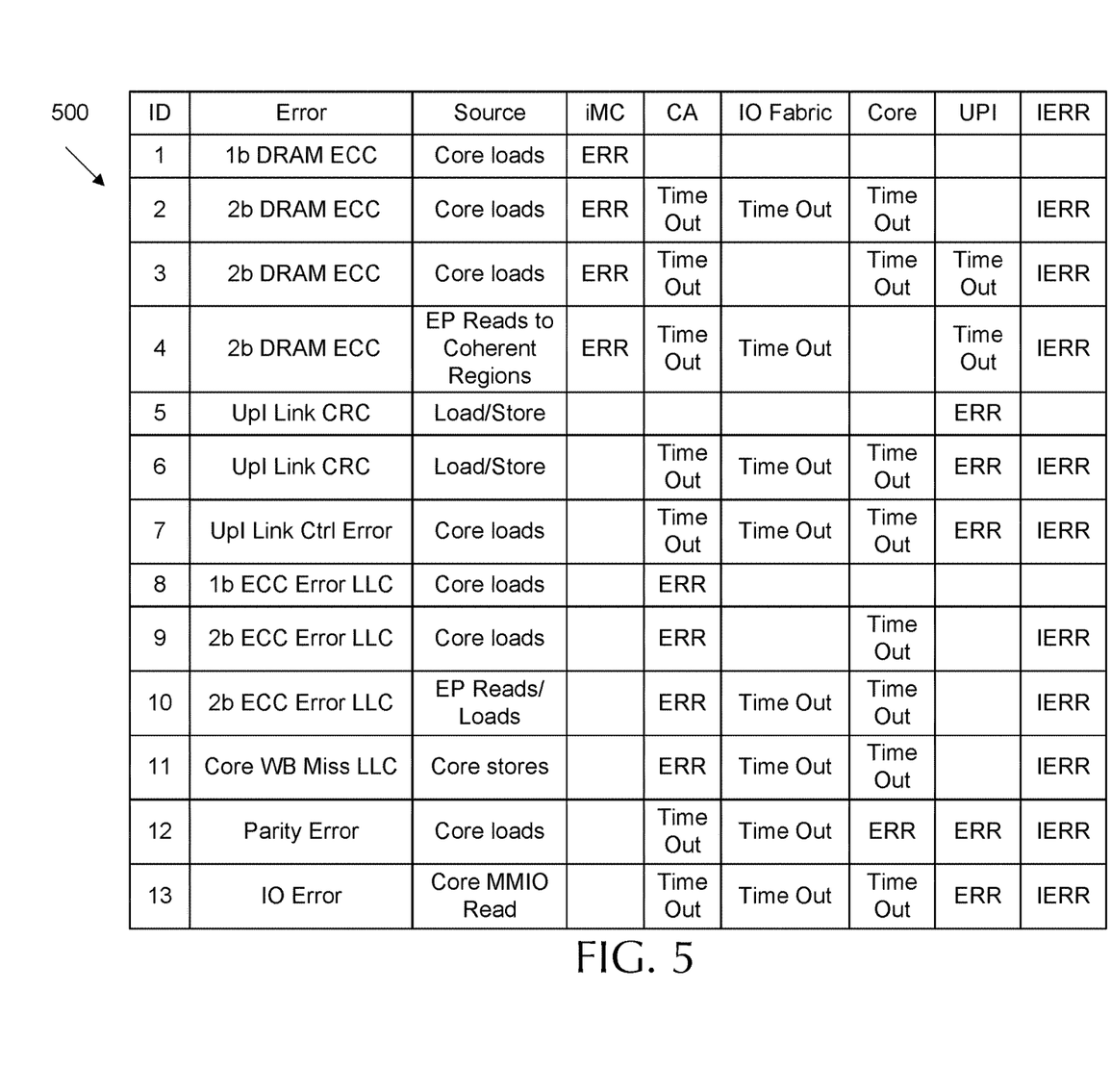
FIG. 5 is a table illustrating example outputs resulting from correlated errors.

FIG. 5 is a table 500 illustrating example outputs resulting from correlated errors. Table 500 represents example results when errors occur on systems, such as system 100, 200, and/or 300 as a result of MCE handler actions, such as the actions described in method 400. For each group of errors, table 500 indicates the actual error, the source (e.g. cause of the error), and the results in the MC banks for each FUB, where the FUBs include an iMC, a cache agent (CA), an IO Fabric, a core, a coherent fabric/unified package interconnect (UPI), and a processor FUB that tracks internal errors (IERR).

Errors 1-4 are each the result of MCEs generated by dynamic random access memory (DRAM) (e.g. RAM 130) error correcting codes (ECCs). Errors 1-3 are system memory access errors that manifest when a core attempts to load data from RAM. Error 4 is a system memory access error that manifests when a PCIe end point (EP) attempts to read data from a coherent region of RAM memory. Errors 1-4 are each caused by a problem in the iMC, but errors 2-4 show multiple secondary and tertiary errors. As such, different types of iMC errors can result in very different error data in the MC banks of related FUBs.

Errors 5-7 are each the result of MCEs generated at the UPI (e.g. coherent fabric 114) between CPU packages. Errors 5-6 manifest as a problem with a UPI link cyclical redundancy check when a source core attempts to load or store data over the coherent fabric. Error 7 manifests as a UPI link control error when a core attempts to load data over the coherent fabric. Errors 5-7 are each manifestations of different problems in the coherent fabric, as stored in MC banks related to the UPI. However, the errors can result in multiple secondary and tertiary errors in related FUBs as shown in the other MC banks.

Errors 8-11 are each related to a last level cache (LLC) (e.g. cache 113). Errors 8-9 are ECC related LLC errors that manifest when a core attempts to load data from cache, and error 10 manifests when a PCIe EP attempts to read or load to cache. Error 11 manifests as a core write-back (WB) miss when the core attempts to store data to a cache. Errors 8-11 are each caused by different problems with the CA operating the cache as shown in the CA MC bank. However, the errors can result in multiple secondary and tertiary errors in related FUBs as shown in the other MC banks.

Errors 12-13 are a parity error and an IO error, respectively. Error 12 occurs when a core (e.g. core 111) attempts to load data, but a related parity check fails. Error 13 occurs when a core attempts to perform a memory mapped IO (MMIO) read to memory and fails to receive the requested data. Error 12 is caused by an internal problem with the core as shown by the core MC bank, with secondary/tertiary errors represented in other MC banks. Error 13 is caused by a problem in the IO fabric, as shown by the IO fabric MC bank, with secondary/tertiary errors represented in other MC banks.

As shown in table 500, errors in a first FUB can cause a variety of different secondary and tertiary errors to be stored in MC banks for related FUBs. Further, substantially similar errors can result in different patterns of secondary/tertiary errors. As such, pinpointing the FUB causing the error solely by reviewing the various MC banks is difficult. However, further considering timestamps generated upon occurrence of each error, as stored in each MC bank or a corresponding U-box as discussed above, immediately clarifies which FUB is the cause of the other errors. Accordingly, employing error occurrence timestamps greatly reduces debugging difficulty.

Figure 6:
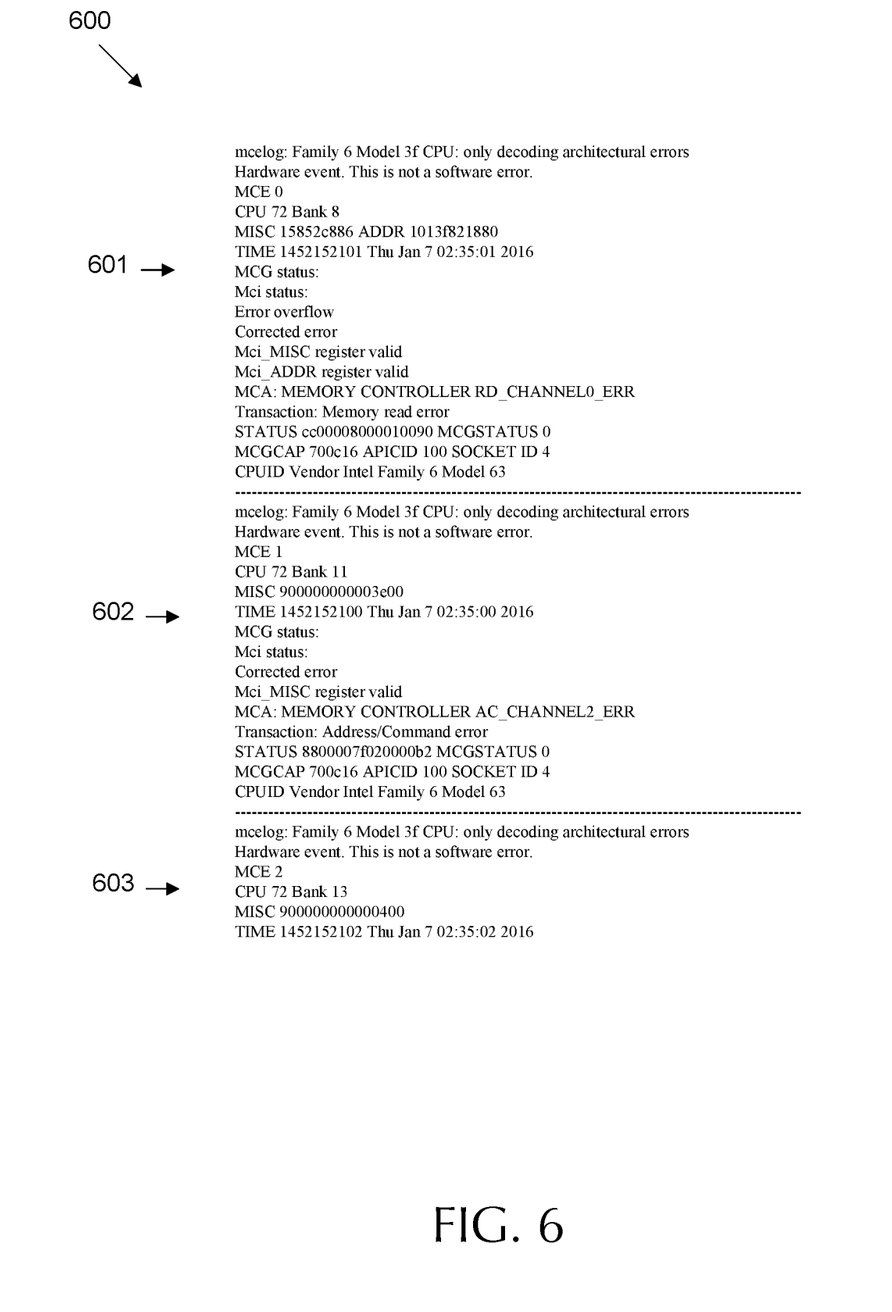
FIG. 6 is an embodiment of an error log illustrating timestamps corresponding to error occurrence.

FIG. 6 is an embodiment of an error log 600 illustrating timestamps corresponding to error occurrence. Errors 601, 602, and 603 are related errors and each display information as read from the corresponding MC bank (e.g. MC bank 120, 220, and/or 320). Errors 601-603 may be the result of a process, such as method 400. Errors 601-603 are separated by dashed lines to increase clarity. Each error includes a timestamp indicated by the word TIME and represented as both a clock cycle and in wall time. Error 601 indicates a timestamp of cycle 1452152101 on Thursday Jan. 7, 2016 at 2:35:01. Error 602 indicates a timestamp of cycle 1452152100 on Thursday Jan. 7, 2016 at 2:35:00. Error 603 indicates a timestamp of cycle 1452152102 on Thursday Jan. 7, 2016 at 2:35:02. As such, one can quickly determine that error 602 occurred first in time and errors 601 and 603 followed immediately thereafter based on either the cycle number or the seconds of the wall time. Accordingly, error 602 can be determined to be the primary error and errors 601 and 603 can be determined to be secondary/tertiary errors without reviewing the data associated with each error. Thus, the error occurrence timestamp can be employed to quickly sort errors and/or disregard secondary/tertiary dependent errors, which substantially contributes to ease of debugging and allows for greater automation in debugging. Greater debugging automation can, in turn, allow for more complex errors to be managed by the MCE handlers without human intervention, resulting in a wider variety of errors that can be addressed without resorting to a full system reset.

Figure 7:
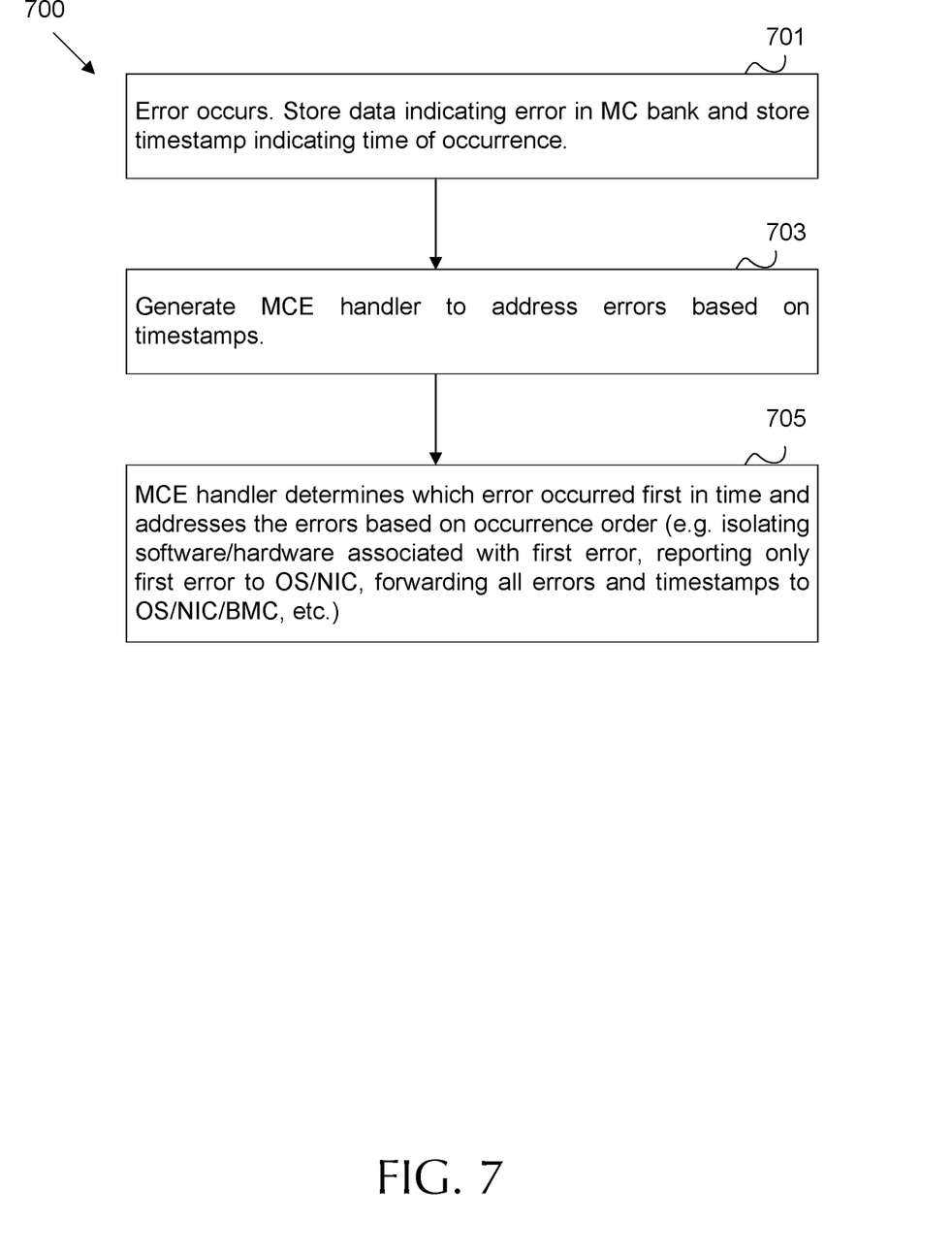
FIG. 7 is a flow diagram of an embodiment of a method for storing timestamps to support exception handling.

FIG. 7 is a flow diagram of an embodiment of a method 700 for storing timestamps to support exception handling. Method 700 may be implemented on a CPU package, such as CPU package 110 in a system, such as system 100, 200, and/or 300. Method 700 may also be employed in conjunction with method 400 to generate an error log such as error log 600 in the event of errors, such as the errors described with respect to table 500.

At block 701, one or more errors occur, for example in the CPU package or in associated components (e.g. RAM, other coupled CPU packages, interconnected external devices, etc.) Data indicating the error(s) is stored in MC banks upon occurrence of the errors. Timestamps indicating a time of occurrence for each error are also stored, in the MC banks or in a corresponding U-Box, either of which may be configured to manage error handling. At block 703, a machine check exception handler is generated to address the errors based on the timestamps. At block 705, the machine check exception handler employs the timestamps to determine which of the errors occurred first in time, which can be referred to as the first error. The machine check exception handler can then address the errors based on occurrence order. For example, the machine check exception handler may address the errors by determining a software application that corresponds to the first error, and isolating the software application to recover from the errors. As another example, the machine check exception handler may address the errors by determining a FUB of hardware responsible for the first error, and recovering from the errors by preventing further allocation of corresponding hardware at the FUB responsible for the first error. As yet another example, the machine check exception handler may address the errors by forwarding data indicating the first error to an OS, a BMC, and/or to an administrator via an NIC without forwarding data indicating the errors that did not occur first in time. As yet another example, the machine check exception handler may address the errors by forwarding data indicating all errors and all timestamps to the OS, an NIC, and/or a BMC.

EXAMPLES

Illustrative examples of the technologies disclosed herein are provided below. An embodiment of the technologies may include any one or more, and any combination of, the examples described below.

Example 1 includes a processor comprising: a plurality of components; and a plurality of machine check (MC) banks, each MC bank to: store data indicating an error upon occurrence of the error in a corresponding component; and store a timestamp corresponding to the error upon occurrence of the error.

Example 2 includes the subject matter of Example 1, and wherein the components are to generate a machine check exception handler upon occurrence of one or more errors, and wherein the machine check exception handler is to: collect the data indicating the errors and the corresponding timestamps from the MC banks; and employ the timestamps to determine which of the errors occurred first in time.

Example 3 includes the subject matter of Examples 2, and wherein the machine check exception handler is further to employ the data of the error that occurred first in time to: determine a software application corresponding to the error that occurred first in time; and isolate the software application to recover from the errors.

Example 4 includes the subject matter of Examples 2-3, and 4 and wherein the machine check exception handler is further to employ the data of the error that occurred first in time to: determine the component responsible for the error that occurred first in time; and recover from the errors by preventing further allocation of corresponding hardware at the component responsible for the error that occurred first in time.

Example 5 includes the subject matter of Examples 2-4, and wherein the machine check exception handler is further to forward data indicating the error that occurred first in time to an operating system without forwarding data indicating the errors that did not occur first in time.

Example 6 includes the subject matter of Example 1, and wherein the component s are to generate a machine check exception handler upon occurrence of one or more errors, and wherein the machine check exception handler is to: collect the data indicating the errors and the corresponding timestamps from the MC banks; and forward the data indicating the errors and the corresponding timestamps to an operating system.

Example 7 includes the subject matter of Example 6, further comprising a utility box (U-Box), wherein the machine check exception handler forwards the timestamps to the operating system via the U-box, and wherein the U-Box is to: convert the timestamps into real time; and forward time data corresponding to the timestamps to the operating system.

Example 8 includes the subject matter of Examples 1-7, and wherein the MC banks are further to forward the timestamps toward an operating system upon a reset to support determining that the errors occurred prior to the reset.

Example 9 includes the subject matter of Examples 1-8, wherein the MC banks are to forward the timestamps toward a BMC for error sorting.

Example 10 includes a processor comprising: a plurality of components to execute instructions, the plurality of components; a plurality of MC banks, each MC bank to store data indicating an error upon occurrence of one or more errors in a corresponding component; and a U-Box to store timestamps corresponding to the errors upon occurrence of the errors.

Example 11 includes the subject matter of Example 10, and wherein the U-Box is further to store error identifiers corresponding to the timestamps to support correlation of each timestamp to each error as stored in the MC banks.

Example 12 includes the subject matter of Examples 10-11, and wherein the U-Box is further to: convert the timestamps into real time; and forward time data corresponding to the timestamps to the operating system.

Example 13 includes the subject matter of Examples 10-12, and wherein the U-Box is further to forward the timestamps over a network interface controller.

Example 14 includes the subject matter of Examples 10-13, and wherein the U-Box is further to forward the timestamps toward a BMC for error sorting.

Example 15 includes a method implemented in a processor, the method comprising: storing data indicating errors in MC banks upon occurrence of one or more errors associated with the processor; storing timestamps indicating a time of occurrence for each error; and generating a machine check exception handler to address the errors based on the timestamps.

Example 16 includes the subject matter of Example 15, and wherein the timestamps are stored in the MC banks or in a U-Box to manage error handling.

Example 17 includes the subject matter of Examples 15-16, and wherein addressing the errors includes: employing the timestamps to determine which of the errors occurred first in time; determining a software application corresponding to the error that occurred first in time; and isolating the software application to recover from the errors.

Example 18 includes the subject matter of Examples 15-16, and wherein addressing the errors includes: employing the timestamps to determine which of the errors occurred first in time; determining a component of hardware responsible for the error that occurred first in time; and recovering from the errors by preventing further allocation of corresponding hardware at the component responsible for the error that occurred first in time.

Example 19 includes the subject matter of Examples 15-16, and wherein addressing the errors includes: employing the timestamps to determine which of the errors occurred first in time; and forwarding data indicating the error that occurred first in time to an operating system without forwarding data indicating the errors that did not occur first in time.

Example 20 includes the subject matter of Examples 15-16, and wherein addressing the errors includes: performing a reset of the processor; and forwarding the timestamps toward an operating system after the reset to support determining that the errors occurred prior to the reset.

Example 21 includes a computing device comprising: a processor; and a memory having stored therein a plurality of instructions that when executed by the processor cause the computing device to perform the method of any of Examples 15-20.

Example 22 includes one or more machine-readable storage media comprising a plurality of instructions stored thereon that, in response to execution by a computing device, cause the computing device to perform the method of any of Examples 15-20.

Example 23 includes a processor comprising: a plurality of components to execute instructions; a means for storing data indicating an error upon occurrence of the error in a corresponding component; and a means for storing a timestamp corresponding to the error upon occurrence of the error.

Example 24 includes the subject matter of Example 23, and further comprising: a means for collecting the data indicating the errors and the corresponding timestamps; and a means for employing the timestamps to determine which of the errors occurred first in time.

Example 25 includes the subject matter of Example 24, and further comprising: a means for determining a software application corresponding to the error that occurred first in time; and a means for isolating the software application to recover from the errors.

Example 26 includes the subject matter of Examples 24-25, and further comprising: a means for determining the component responsible for the error that occurred first in time; and a means for recovering from the errors by preventing further allocation of corresponding hardware at the component responsible for the error that occurred first in time.

Example 27 includes the subject matter of Examples 24-26, and further comprising a means for forwarding data indicating the error that occurred first in time to an operating system without forwarding data indicating the errors that did not occur first in time.

Example 28 includes the subject matter of Examples 23-27, and further comprising: a means for collecting the data indicating the errors and the corresponding timestamps from the MC banks; and a means for forwarding the data indicating the errors and the corresponding timestamps to an operating system.

Example 29 includes the subject matter of Examples 23-28, and further comprising a means for converting the timestamps into real time prior to forwarding time data corresponding to the timestamps to the operating system.

Example 30 includes the subject matter of Examples 23-29, and further comprising a means for forwarding the timestamps toward an operating system upon a reset to support determining that the errors occurred prior to the reset.

Example 31 includes the subject matter of Examples 23-30, and further comprising a means for forwarding the timestamps toward a BMC for error sorting.

Example 32 includes the subject matter of Examples 23-31, and further comprising a means for forwarding the timestamps over a network.

Example 33 includes the subject matter of Examples 8, 20, and 30, where the reset is a warm reset.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

Also, when reference is made in this application to a method having two or more defined steps or operations, the defined steps or operations can be carried out in any order or simultaneously, unless the context excludes those possibilities.

Although specific embodiments of the invention have been illustrated and described for purposes of illustration, it will be understood that various modifications may be made without departing from the spirit and scope of the invention. Accordingly, the invention should not be limited except as by the appended claims.

We claim:

1. A processor comprising:
   a plurality of central processing unit (CPU) cores, each of the plurality of CPU cores including a corresponding cache;
   a shared cache to be shared by the plurality of CPU cores; and
   a plurality of sets of registers, including a different set of registers corresponding to each of the plurality of CPU cores, and a set of registers corresponding to the shared cache, the plurality of sets of registers to store data associated with detected errors, each of the plurality of sets of registers including:
   a control register;
   a status register; and
   a timestamp register,
   wherein the processor, when an error is detected in a CPU core of the plurality of CPU cores, is to:
   store data in a status register of a set of registers corresponding to the CPU core to indicate whether the error was corrected; and
   store a timestamp in a timestamp register of the set of registers corresponding to the CPU core, the timestamp to indicate a time of detection of the error by the CPU core, wherein the timestamp register of the set of registers corresponding to the CPU core is a 64-bit register and only stores the timestamp.

2. The processor of claim 1, wherein the set of registers corresponding to the CPU core comprises an address register, and wherein the processor is to store data in the address register to indicate an address associated with the error.

3. The processor of claim 1, wherein the processor is capable of providing the timestamp in a plurality of different representations.

4. The processor of claim 1, wherein a length of the timestamp comprises 64-bits.

5. The processor of claim 1, wherein the set of registers corresponding to the CPU core comprises a miscellaneous register to store data associated with the error.

6. The processor of claim 1, wherein the processor is to generate timestamps for different errors based on a time difference between different clock signals corresponding to the different errors.

7. The processor of claim 1, wherein the processor is capable of converting a timestamp based on a clock cycle into the timestamp.

8. A system comprising:
   a processor comprising:
   a plurality of central processing unit (CPU) cores, each of the plurality of CPU cores including a corresponding cache;
   a shared cache to be shared by the plurality of CPU cores; and
   a plurality of sets of registers, including a different set of registers corresponding to each of the plurality of CPU cores, and a set of registers corresponding to the shared cache, the plurality of sets of registers to store data associated with detected errors, each of the plurality of sets of registers including:
   a control register;
   a status register; and
   a timestamp register,
   wherein the processor, when an error is detected in a CPU core of the plurality of CPU cores, is to:
   store data in a status register of a set of registers corresponding to the CPU core to indicate whether the error was corrected; and
   store a timestamp in a timestamp register of the set of registers corresponding to the CPU core, the timestamp to indicate a time of detection of the error by the CPU core, wherein the timestamp register of the set of registers corresponding to the CPU core is a 64-bit register and only stores the timestamp; and
   a system memory coupled to the processor.

9. The system of claim 8, wherein the set of registers corresponding to the CPU core comprises an address register, and wherein the processor is to store data in the address register to indicate an address associated with the error.

10. The system of claim 8, wherein the processor is capable of providing the timestamp in a plurality of different representations.

11. The system of claim 8, wherein a length of the timestamp comprises 64-bits.

12. The system of claim 8, wherein the set of registers corresponding to the CPU core comprises a miscellaneous register to store data associated with the error.

13. The system of claim 8, wherein the processor is to generate timestamps for different errors based on a time difference between different clock signals corresponding to the different errors.

14. The system of claim 8, wherein the processor is capable of converting a timestamp based on a clock cycle into the timestamp.

15. The system of claim 8, further comprising a Peripheral Component Interconnect Express (PCIe) bus coupled to the processor.

16. The system of claim 8, further comprising a Network Interface Controller coupled to the processor.

17. The system of claim 8, further comprising a baseboard management controller (BMC) coupled to the processor.

18. The system of claim 8, wherein the system memory comprises a Dynamic Random Access Memory (DRAM).

19. A method comprising:
  processing data with a plurality of central processing unit (CPU) cores;
  storing data in a plurality of caches respectively corresponding to different ones of the plurality of CPU cores;
  storing data in a shared cache shared by the plurality of CPU cores;
  detecting a first error in a CPU core of the plurality of CPU cores;
  accessing a control register of a first set of registers used to control error handling and store information about errors detected in the CPU core;
  storing data in a status register of the first set of registers to indicate whether the first error was corrected;
  storing a first timestamp in a first 64-bit timestamp register of the first set of registers to indicate a time of detection of the first error by the CPU core, wherein the first timestamp register only stores the timestamp;
  detecting a second error in the shared cache;
  accessing a control register of a second set of registers used to control error handling and store information about errors detected in the shared cache;
  storing data in a status register of the second set of registers to indicate whether the second error was corrected; and
  storing a second timestamp in a second 64-bit timestamp register of the second set of registers to indicate a time of detection of the second error by the shared cache, wherein the second timestamp register only stores the timestamp.

20. The method of claim 19, wherein storing the first timestamp in the 64-bit timestamp register of the first set of registers comprises storing a 64-bit timestamp.

21. The method of claim 19, further comprising converting a timestamp based on a clock cycle into the first timestamp that is stored in the 64-bit timestamp register of the first set of registers.

* * * * *